(12) United States Patent
Wan et al.

(10) Patent No.: US 7,924,795 B2
(45) Date of Patent: Apr. 12, 2011

(54) APPARATUS AND METHOD FOR COORDINATING BLUETOOTH AND WIRELESS LOCAL AREA NETWORK (WLAN) AND WIMAX COMMUNICATIONS

(75) Inventors: Wei-Lun Wan, Hsinchu (TW);
Hong-Kai Hsu, Yonghe (TW);
Chung-Shine Huang, Yung-Ho (TW);
Ying-Chi Kuo, Tainan (TW); Jiun-Jang Su, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 248 days.

(21) Appl. No.: 12/058,777

(22) Filed: Mar. 31, 2008

(65) Prior Publication Data
US 2009/0245279 A1 Oct. 1, 2009

(51) Int. Cl.
*H04W 4/00* (2009.01)
(52) U.S. Cl. .................................................. 370/338
(58) Field of Classification Search .................. 370/468, 370/338
See application file for complete search history.

(56) References Cited

U.S. PATENT DOCUMENTS

| 7,519,039 | B2* | 4/2009 | Carter et al. ............... 370/338 |
| 2004/0192222 | A1 | 9/2004 | Vaisanen et al. |
| 2005/0276241 | A1* | 12/2005 | Kamerman et al. ......... 370/328 |
| 2006/0274704 | A1* | 12/2006 | Desai et al. ............... 370/338 |
| 2007/0275746 | A1 | 11/2007 | Bitran |
| 2008/0318630 | A1* | 12/2008 | Gil ............................ 455/561 |
| 2009/0137206 | A1* | 5/2009 | Sherman et al. ........... 455/41.2 |

FOREIGN PATENT DOCUMENTS

| EP | 1605643 | 12/2005 |
| EP | 1860833 | 11/2007 |
| WO | 2005020518 | 3/2005 |

OTHER PUBLICATIONS

DE Office Action mailed Apr. 23, 2009.
English abstract of DE Office Action mailed Apr. 23, 2009.
Office Action dated Dec. 19, 2008 in Corresponding German Patent Application.

* cited by examiner

*Primary Examiner* — Derrick W Ferris
*Assistant Examiner* — Angel Brockman
(74) *Attorney, Agent, or Firm* — Thomas|Kayden

(57) ABSTRACT

The invention provides a method for operating an apparatus capable of Bluetooth and Wireless Local Area Network (WLAN)/WiMAX communications. In one embodiment, the apparatus comprises a Bluetooth module, and a WLAN/WiMAX unit comprising a packet traffic arbitration (PTA) module, and a WLAN/WiMAX module. The Bluetooth module sends a request for Bluetooth signal transceiving to be performed in a Bluetooth time slot to the WLAN/WiMAX unit, wherein the request comprises a length information about length of a transceiving time period for Bluetooth signal transceiving. The Bluetooth module then performs an Bluetooth signal transceiving during the transceiving time period of the Bluetooth time slot after the WLAN/WiMAX unit grants the request. The WLAN/WiMAX unit then performs an WLAN/WiMAX signal transceiving during a residual time period of the Bluetooth time slot in response to the length information.

19 Claims, 7 Drawing Sheets

APPARATUS AND METHOD FOR COORDINATING BLUETOOTH AND WIRELESS LOCAL AREA NETWORK (WLAN) AND WIMAX COMMUNICATIONS

BACKGROUND OF THE INVENTION

1. Field of the Invention

The invention relates to coordination between Bluetooth, Wireless Local Area Network (WLAN) and WiMAX communications, and more particularly to apparatus and method for coordinating Bluetooth, WLAN and WiMAX communications.

2. Description of the Related Art

Bluetooth and WLAN/WiMAX are both important communication channels for commercial electronic products, such as mobile phones. Bluetooth and WLAN channels, however, both communicate via 2.4 GHz Industrial, Science, and Medical (ISM) band. Referring to FIG. 1A, a schematic diagram of a WLAN band conforming to the IEEE 802.11b standard is shown. Three static non-overlapping WLAN channels with bandwidth of 22 MHz are spread on a frequency band ranging from 2400 Hz to 2483.5 Hz. Referring to FIG. 1B, a schematic diagram of a Bluetooth band is shown. 79 Bluetooth hopping channels with bandwidths of 1 MHz are spread on a frequency band ranging from 2400 Hz to 2483.5 Hz. Moreover, modern 802.16a (WiMAX) channels are spread on a frequency band from the 2 to 11 GHz. If a commercial electronic device utilizes both a Bluetooth channel and a WLAN/WiMAX channel for communications, signal transceiving errors may be induced due to signal interference between simultaneously transmitted Bluetooth signals and WLAN/WiMAX signals, as the WLAN/WiMAX channel frequency band may overlap the Bluetooth channel frequency band. Thus, the invention provides a new apparatus and method utilizing both Bluetooth and WLAN/WiMAX communications to solve the above problem.

BRIEF SUMMARY OF THE INVENTION

The invention provides a method for operating an apparatus capable of Bluetooth and Wireless Local Area Network (WLAN)/WiMAX communications. In one embodiment, the apparatus comprises a Bluetooth module, and a WLAN/WiMAX unit comprising a packet traffic arbitration (PTA) module, and a WLAN/WiMAX module. The Bluetooth module sends a request for Bluetooth signal transceiving to be performed in a Bluetooth time slot to the WLAN/WiMAX unit, wherein the request comprises length information about length of a transceiving time period for Bluetooth signal transceiving. The Bluetooth module then performs an Bluetooth signal transceiving during the transceiving time period of the Bluetooth time slot after the WLAN/WiMAX unit grants the request. The WLAN/WiMAX unit then performs an WLAN/WiMAX signal transceiving during a residual time period of the Bluetooth time slot in response to the length information.

The invention also provides an apparatus capable of wireless communications. In one embodiment, the apparatus comprises a first wireless transceiving module, a second wireless transceiving module, and a packet traffic arbitration (PTA) module coupled between the first and second wireless transceiving modules. The first wireless transceiving module sends a first request for a first signal transceiving to be performed in a first time slot to the PTA module, and performs the first signal transceiving during a transceiving time period of the first time slot after the first request is granted by the PTA module, wherein the first request comprises length information about length of the transceiving time period for the first signal transceiving. The second wireless transceiving module performs a second signal transceiving during a residual time period of the first time slot in response to the length information.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
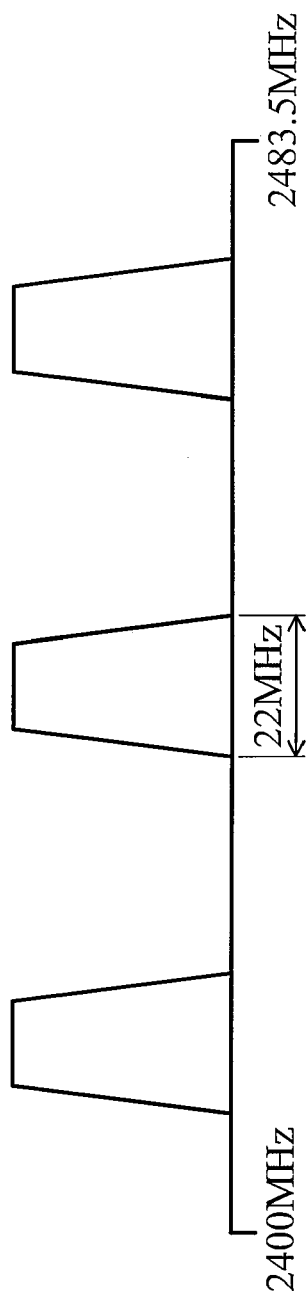
FIG. 1A is a schematic diagram of a WLAN band conforming to the IEEE 802.11b standard.
Figure 1B:
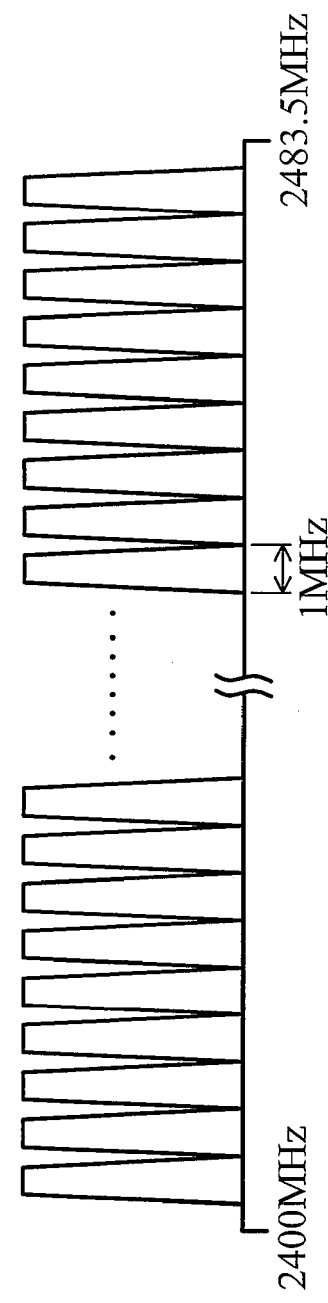
FIG. 1B is a schematic diagram of a Bluetooth band.
Figure 2A:
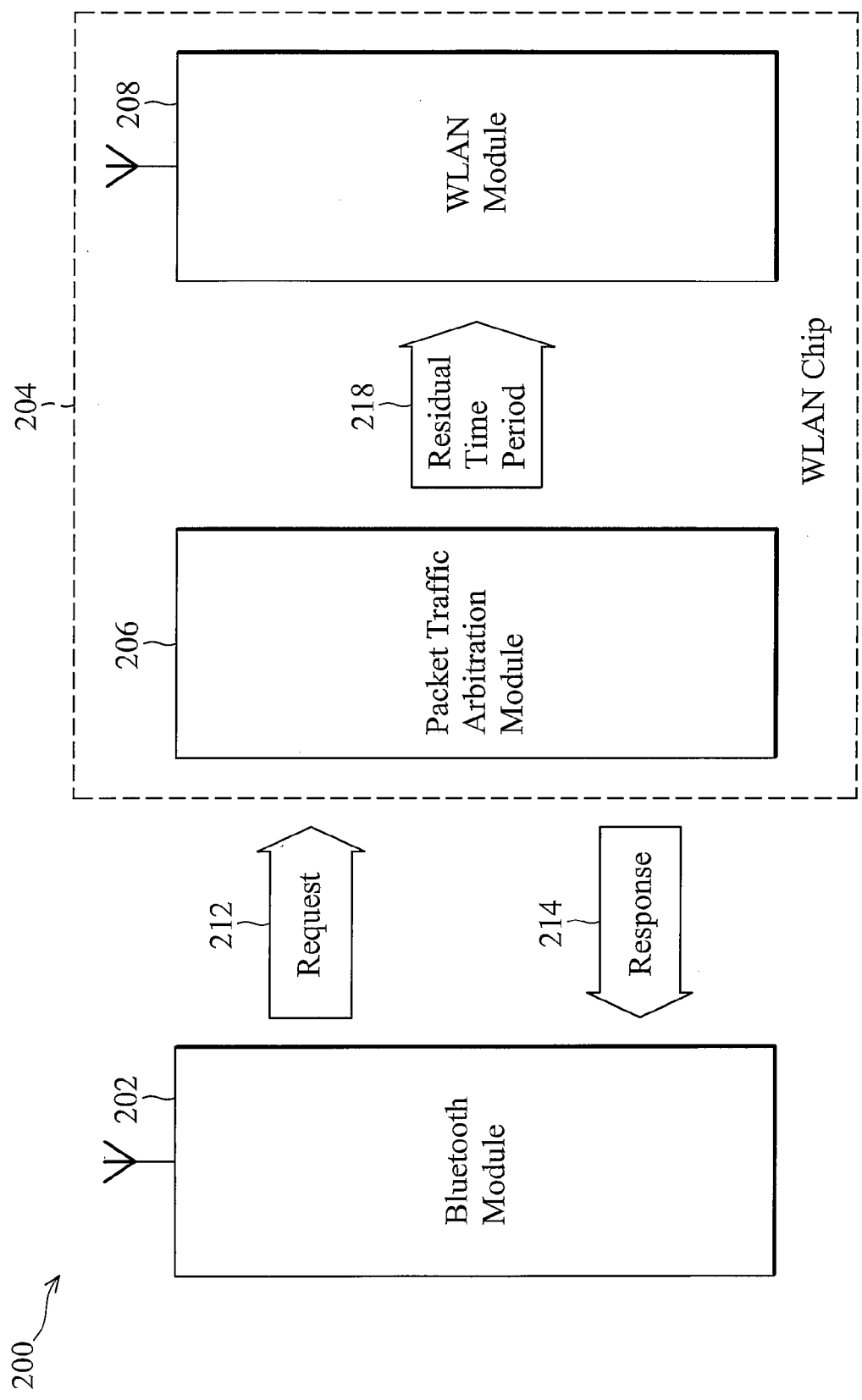
FIG. 2A is a block diagram of an embodiment of an apparatus capable of Bluetooth and WLAN communications according to the invention.
Figure 3:
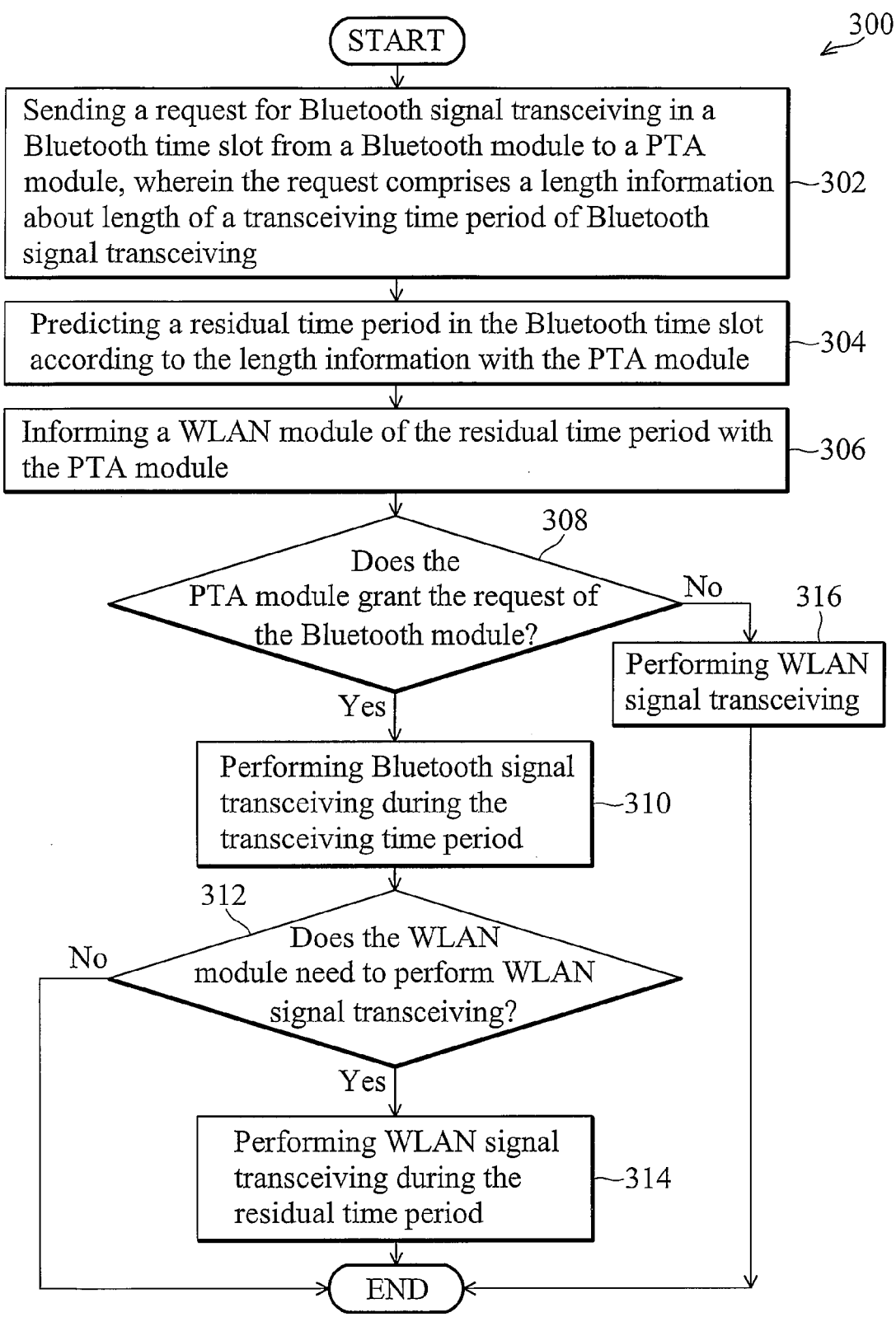
FIG. 3 is a flowchart illustrating an embodiment of a method for cooperating Bluetooth and WLAN communications according to the invention.

Referring to FIG. 2A, a block diagram of an embodiment of an apparatus 200 capable of Bluetooth and WLAN communications according to the invention is shown. The apparatus 200 comprises a Bluetooth module 202 for Bluetooth communications, and a WLAN chip 204 for WLAN communications. The WLAN chip 204 comprises two sub-modules, a WLAN module 208 for WLAN communications and a packet traffic arbitration (PTA) module 206. The apparatus operates according to FIG. 3, which is a flowchart of an embodiment of a method 300 for coordinating Bluetooth and WLAN communications. When the Bluetooth module 202 is required to perform Bluetooth signal transceiving, the Bluetooth module 202 must sends a request 212 for performing Bluetooth signal transceiving to the PTA module 206 (step 302). The request 212 sent by the Bluetooth module 202 comprises length information about a length of a transceiving time period for the requested Bluetooth signal transceiving.

After the PTA module 206 receives the request 212, the PTA module 206 first estimates a residual time period according to the length information of the request 212 (step 304). If the request 212 is to perform Bluetooth signal transceiving in a Bluetooth time slot, the residual time period indicates a remaining time period subsequent to completion of Bluetooth signal transceiving in the Bluetooth time slot. In one embodiment, the PTA module 206 determines a Bluetooth transceiving time period according to the length information, and then subtracts the Bluetooth transceiving time period from the Bluetooth time slot to obtain the residual time period. The PTA module 206 then informs the WLAN module 208 of the estimated residual time period 218 (step 306).

The PTA module 206 then determines whether to grant the request 212 or reject the request 212, and sends a response 214 to the Bluetooth module 202 in reply of the request 212 (step 308). If the WLAN module 208 is performing WLAN signal transceiving (step 316), because only one of Bluetooth signal transceiving and WLAN signal transceiving is performed at a time to avoid signal interference, the PTA module 206 rejects the request 212. Otherwise, the PTA 206 grants the request 212. When the Bluetooth module 202 receives the response 214 indicating that the request 212 has been granted, the Bluetooth module 202 performs Bluetooth signal transceiving during the transceiving time period (step 310). Subsequent to completion of Bluetooth signal transceiving is the residual time period. Because no Bluetooth signal is transmitted or received during the residual time period, the WLAN module 208 may perform WLAN signal transceiving during the residual time period without sending requests to the PTA module 206 (step 314), and no signal interference occurs.

Figure 2B:
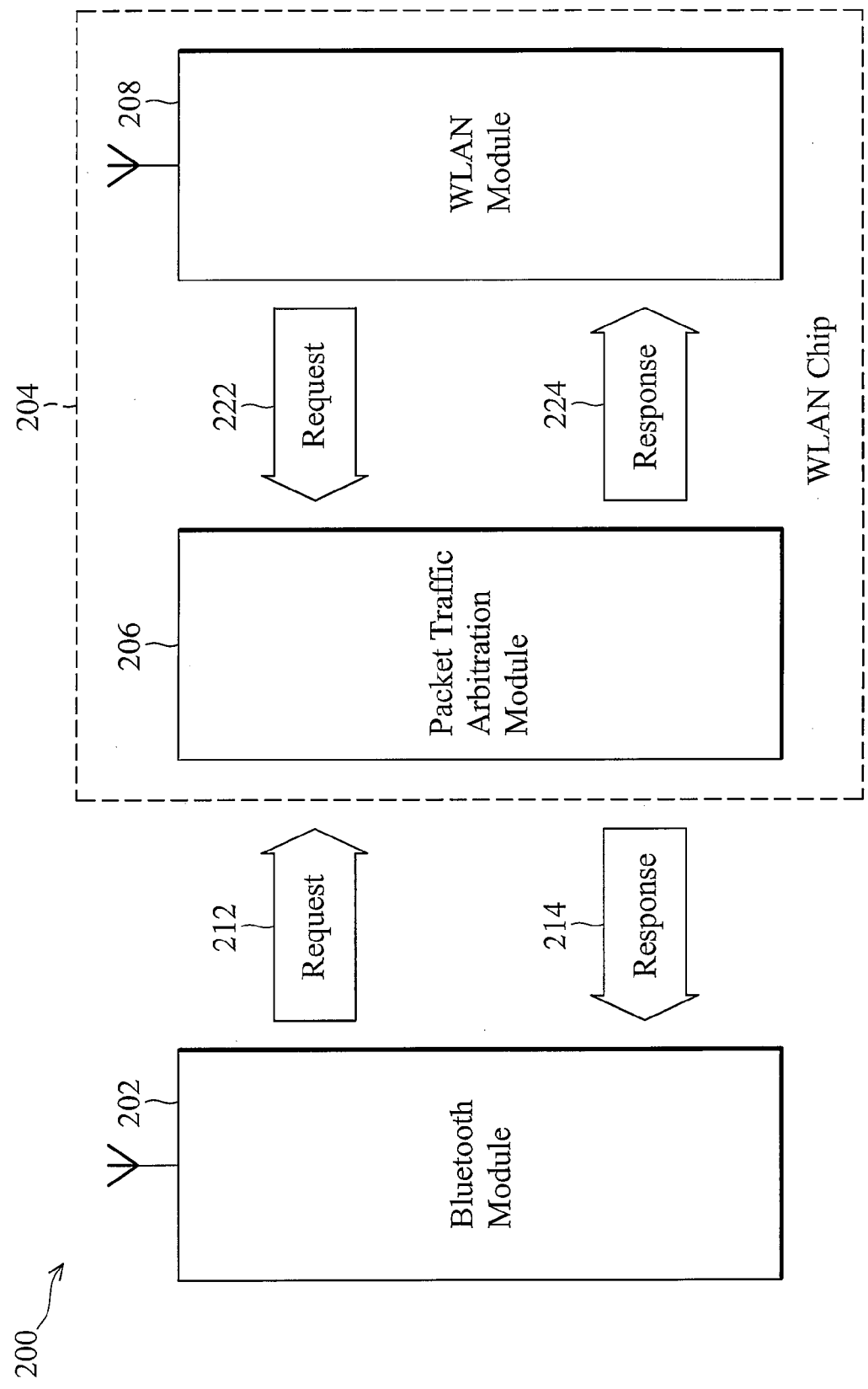
FIG. 2B a block diagram of another embodiment of an apparatus capable of Bluetooth and WLAN communications according to the invention.

The WLAN module 208 in FIG. 2A performs WLAN signal transceiving during a residual time period. The WLAN module 208, however, can also perform WLAN signal transceiving in other time periods, but the WLAN module 208 must send a request to the PTA module 206 in advance. Referring to FIG. 2B, a block diagram of another embodiment of the apparatus 200 capable of Bluetooth and WLAN communications according to the invention is shown. When the Bluetooth module 202 wants to perform Bluetooth signal transceiving, the Bluetooth module 202 sends a request 212 to the PTA module 206. On the other hand, when the WLAN module 208 wants to perform WLAN signal transceiving, the WLAN module 208 sends a request 222 to the PTA module 206. When the PTA module 206 simultaneously receives the requests 212 and 222, the PTA module 206 only grants one of the requests 212 and 222, and respectively sends responses 214 and 224 in reply to the requests 212 and 222. Thus, only one of the Bluetooth module 202 and the WLAN module 208 can perform signal transceiving at a time to avoid signal interference.

Note that, the apparatus 200 may be devised to provide capability of Bluetooth and WiMAX communications, and the WLAN chip 204 may be replaced with a WiMAX chip comprising a WiMAX module and the PTA module 206. Or, the apparatus 200 may be devised to provide capability of WLAN and WiMAX communications, and the Bluetooth module 302 may be replaced with a WiMAX module. The interoperations between the Bluetooth and WiMAX modules, and WLAN and WiMAX modules through the PTA arbitration module 206 may be deduced by the analogy and are briefly described herein for brevity. Moreover, the PTA module 206 may be disposed outside of the WLAN chip 204. Note that the Bluetooth, WLAN and WiMAX module may also be called wireless transceiving modules.

Figure 4:
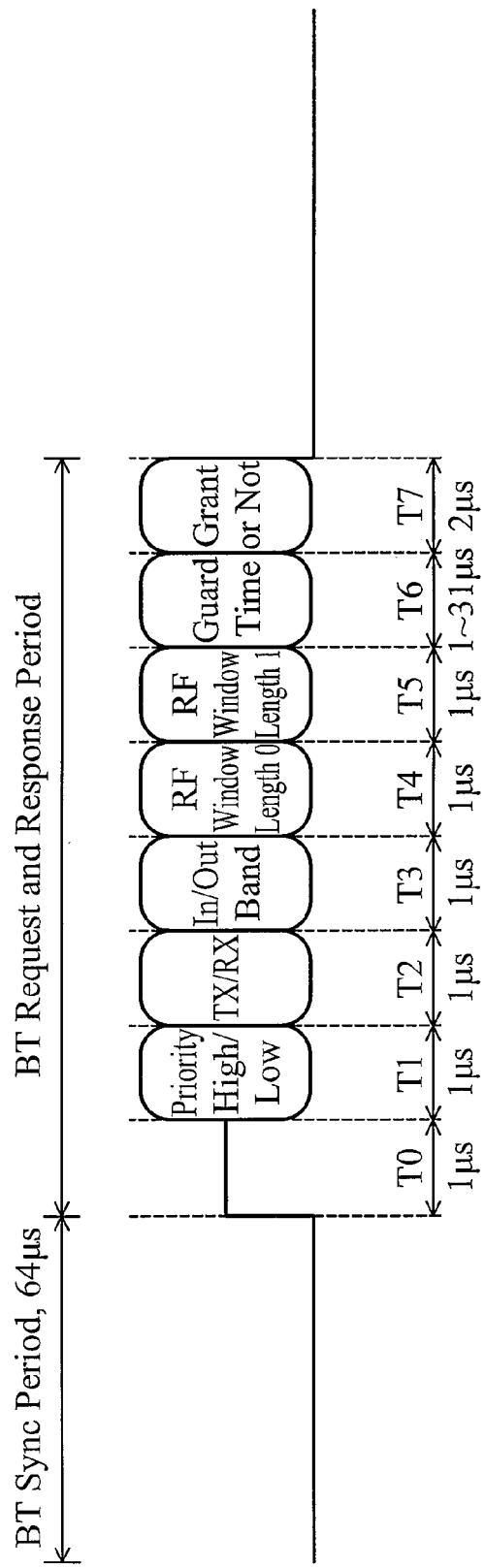
FIG. 4 is a timing diagram of a exemplary request and response for Bluetooth signal transceiving according to the invention.

In one embodiment, the Bluetooth module 202 is coupled to the WLAN chip 204 via a single-wire transmission line, and the request 212 and response 214 are transmitted through the single-wire transmission line. Referring to FIG. 4, a timing diagram of a request for Bluetooth signal transceiving according to the invention is shown. After a synchronization time period of 64 µs passes, the Bluetooth module 202 raises a voltage of the transmission line to a high level for a time period T0 of 1 µs to request the PTA module 206 for Bluetooth signal transceiving. Subsequent to the time period T0, the Bluetooth module 202 sequentially passes a series of information bits to the PTA module 206 via the single-wire transmission line. In one embodiment, the information bits include a priority bit, an TX/RX bit, an In/Out band bit, and a plurality of length bits. The priority bit indicates whether the priority of the request 212 is high, the TX/RX bit indicates whether the requested Bluetooth signal transceiving is signal transmitting or signal receiving, the In/Out band bit indicates whether the frequency band for Bluetooth signal transceiving overlaps a frequency band for WLAN signal transceiving, and the length bits indicate a length of a transceiving time period of the requested Bluetooth signal transceiving.

For example, the Bluetooth module 202 transmits the priority bit during a time period T1 of 1 µs, the TX/RX bit during a time period T2 of 1 µs, the In/Out band bit during a time period T3 of 1 µs, and two length bits during time periods T4 and T5. These two length bits comprise length information indicating one of four categories of Bluetooth packets, wherein the four categories of the Bluetooth packets have different lengths of transceiving time periods. After the PTA module 206 receives the request 212, the PTA module 206 sends a response 214 to the Bluetooth module 202 during time periods T6 of 1~31 µs and T7 of 2 µs. For example, if the PTA module 206 lowers a voltage of the transmission line to a low level during the time periods T6 and T7, the request 212 is granted. If the PTA module 206 raises a voltage of the transmission line to a high level during the time periods T6 and T7, the request 212 is rejected. It is to be understood that the signaling format as shown in FIG. 4 may also be adapted in a WLAN/WiMAX request with relevant modifications if required to the PTA module 206.

Figure 5:
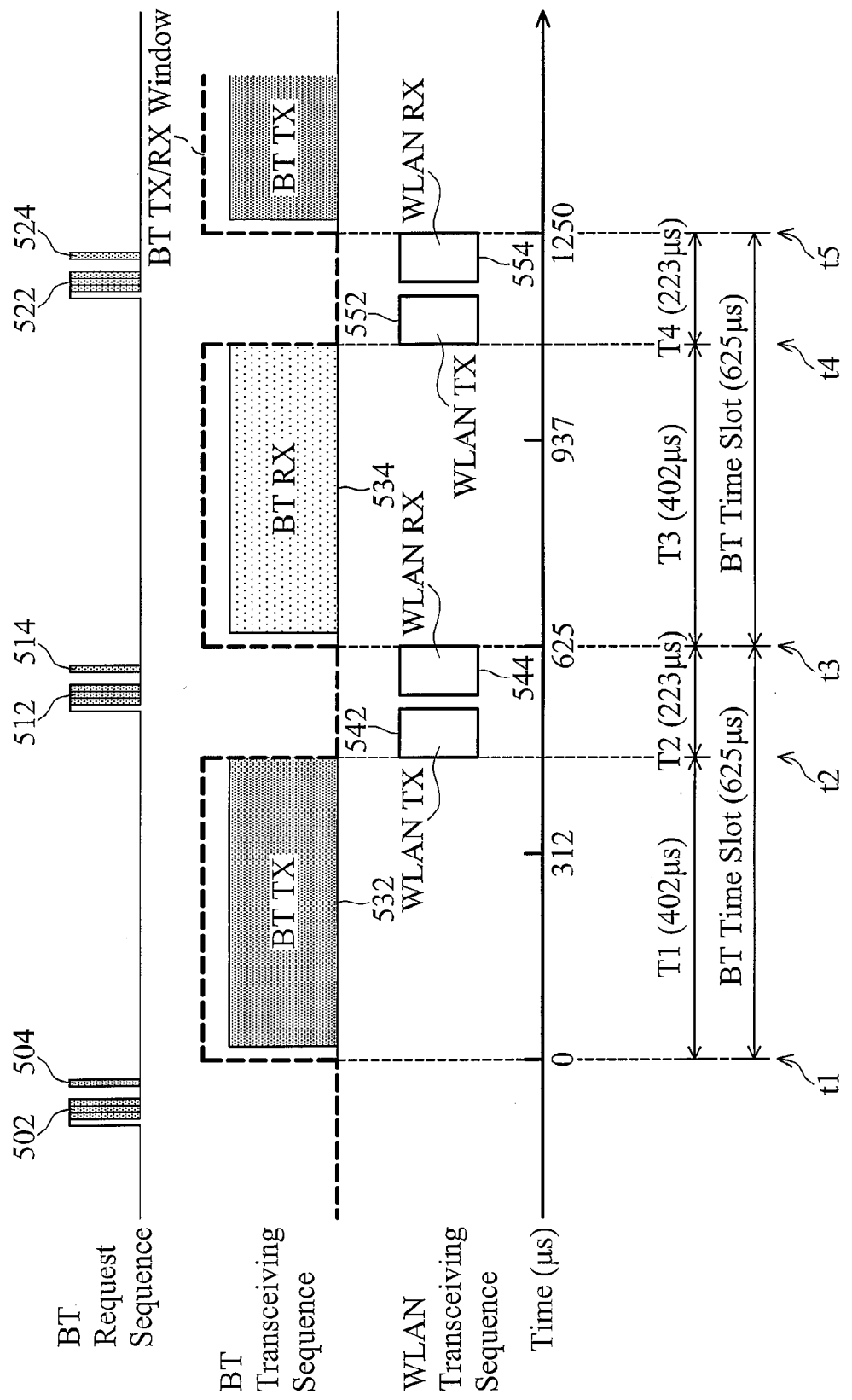
FIG. 5 is a schematic diagram of exemplary timings of Bluetooth and WLAN signal transceiving according to the invention.

Referring to FIG. 5, a schematic diagram of exemplary timings of Bluetooth and WLAN signal transceiving according to the invention is shown. A Bluetooth signal is transmitted and received in a frame of 1250 µs in length. Each frame comprises two time slots with a time period of 625 µs, and a frame generally comprises a time slot for signal transmission and a time slot for signal reception. In FIG. 5, two sequential Bluetooth time slots are shown, wherein a first slot ranges from time t1 to time t3, and a second slot ranges from time t3 to time t5. The Bluetooth module 202 first sends a request 502 for performing Bluetooth signal transmitting in the first time slot to the PTA module 206, and the PTA module 206 grants the request 502 with a response 504. In addition, because the request 502 comprises length information about a Bluetooth transceiving time period T1, the PTA module 206 estimates a residual time period T2 and informs the WLAN module 208 of the residual time period T2. The Bluetooth module 202 therefore performs Bluetooth signal transmission 532 during a transceiving time period T1 ranging from time t1 to time t2. The WLAN module 208 subsequently performs WLAN signal transceiving 542 and 544 during the residual time period T2.

Accordingly, the Bluetooth module 202 sends a request 512 for performing Bluetooth signal receiving in the second time slot to the PTA module 206, and the PTA module 206 grants the request 512 with a response 514. Because the request 512 comprises length information about a Bluetooth transceiving time period T3, the PTA module 206 estimates a residual time period T4 and informs the WLAN module 208 of the residual time period T4. The Bluetooth module 202 therefore performs Bluetooth signal reception 534 during a transceiving time period T3 ranging from time t3 to time t4. The WLAN module 208 subsequently performs WLAN signal transceiving 552 and 554 during the residual time period T4, and no signal interference occurs.

Figure 6:
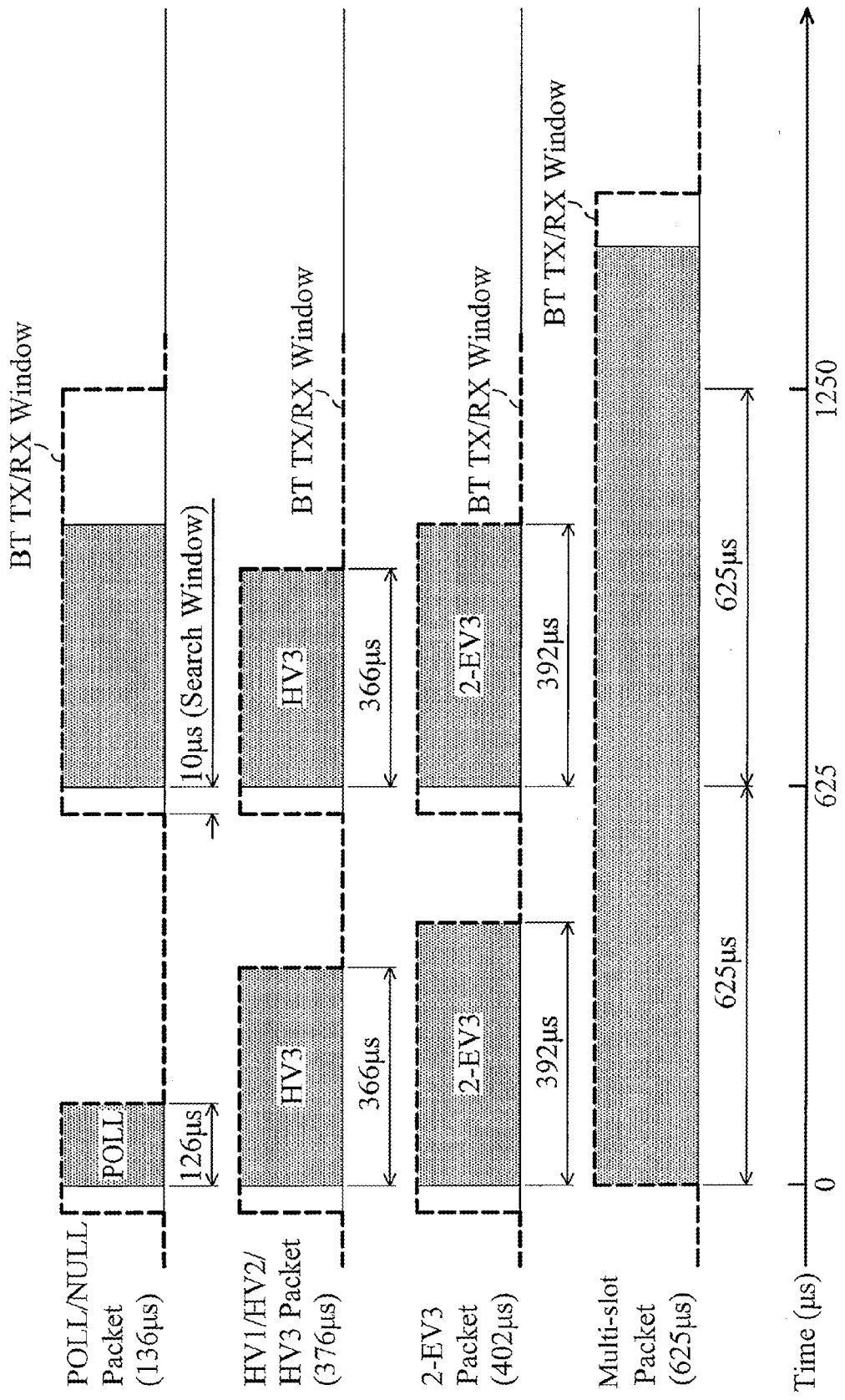
FIG. 6 is a schematic diagram of four exemplary categories of Bluetooth packets with different transceiving time period lengths according to the invention.

Referring to FIG. 6, a schematic diagram of four exemplary categories of Bluetooth packets with different transceiving time period lengths according to the invention is shown. Because the request shown in FIG. 4 comprises 2 length bits, the Bluetooth packets are classified into four categories respectively indicated by length bits "00", "01", "10", and "11". A first packet category has a transceiving time period of 126 μs and refers to a POLL packet or a NULL packet. A second packet category has a transceiving time period of 366 μs and refers to an HV1 packet, an HV2 packet, or an HV3 packet. For example, HV1 packet may carry 10 user payload bytes protected with ⅓ FEC (forward error correction). No CRC (cyclic redundancy check) is used. HV1 packet may be sent at every two slots and carry 1.25 ms of speech at a 64 kb/s rate. HV2 packet may carry 20 user payload bytes protected with a rate ⅔ FEC and be sent at every four slots. HV3 packet may carry 30 unprotected user payload bytes and be sent at every six slots. A third packet category has a transceiving time period of 392 μs and refers to a 2-EV3 packet. A fourth packet category has a transceiving time period of more than 625 μs and refers to a multi-slot packet. Thus, the Bluetooth module 202 can inform the PTA module 206 of a time period length of the requested Bluetooth signal transceiving with a request comprising 2 length bits.

The invention provides an apparatus for coordinating Bluetooth and WLAN/WiMAX communications. The apparatus comprises a Bluetooth module for Bluetooth communications, a WLAN/WiMAX module for WLAN/WiMAX communications, and a PTA module. The Bluetooth module sends a request to the PTA module before it performs Bluetooth signal transceiving, wherein the request comprises information about a length of transceiving time period for the requested Bluetooth signal transceiving. The PTA module then estimates a residual time period according to the request and informs of the estimated residual time period to the WLAN/WiMAX module. It is to be understood that the PTA module may directly inform information about a length of transceiving time period, and the WLAN/WiMAX module accordingly estimates a residual time period. The WLAN/WiMAX module subsequently performs WLAN/WiMAX signal transceiving during the residual time period. Thus, both WLAN/WiMAX signal transceiving and Bluetooth signal transceiving are performed in a Bluetooth time slot to improve signal transceiving efficiency, and no signal interference occurs.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for operating an apparatus capable of Bluetooth and Wireless Local Area Network (WLAN)/WiMAX communications, wherein the apparatus comprises a Bluetooth module for Bluetooth communications, and a WLAN/WiMAX unit comprising a WLAN/WiMAX module for WLAN/WiMAX communications, and a packet traffic arbitration (PTA) module, and the method comprises:

sending a request for Bluetooth signal transceiving to be performed in a 625 μs time slot from the Bluetooth module to the WLAN/WiMAX unit, wherein the request comprises length information about length of a transceiving time period for Bluetooth signal transceiving, wherein the length of the transceiving time period is shorter than the 625 μs time slot;

subtracting the transceiving time period from the 625 μs time slot to obtain a residual time period;

performing an Bluetooth signal transceiving by the Bluetooth module during the transceiving time period of the 625 μs time slot after the WLAN/WiMAX unit grants the request; and performing an WLAN/WiMAX signal transceiving during said residual time period of the 625 μs time slot in response to the length information by the WLAN/WiMAX unit.

2. The method as claimed in claim 1, further comprising:

informing the WLAN/WiMAX module of the residual time period by the PTA module; and performing the WLAN/WiMAX signal transceiving during the residual time period of the 625 μs time slot by the WLAN/WiMAX module.

3. The method as claimed in claim 1, wherein the length information comprises two bits to indicate four categories of Bluetooth packets, wherein the four categories of the Bluetooth packets have different lengths of transceiving time periods.

4. The method as claimed in claim 3, wherein the four categories of Bluetooth packets include a first packet category with a transceiving time period of 126 μs, a second packet category with a transceiving time period of 366 μs, a third packet category with a transceiving time period of 392 μs, and a fourth packet category with a transceiving time period greater than 625 μs.

5. The method as claimed in claim 1, wherein the Bluetooth module is connected to the PTA module via a single-wire transmission line, the request is transmitted from the Bluetooth module to the PTA module via the single-wire transmission line, and information about that the request is granted is transmitted from the PTA module to the Bluetooth module via the single-wire transmission line.

6. The method as claimed in claim 5, wherein the request comprises a series of information bits sequentially transmitted to the PTA module through the single-wire transmission line.

7. The method as claimed in claim 6, wherein the information bits comprises a priority bit indicating whether the priority of the request is high or low, and an TX/RX bit indicating whether Bluetooth signal transceiving requested by the Bluetooth module is to transmit a Bluetooth signal or to receive a Bluetooth signal.

8. The method as claimed in claim 7, further comprising determining whether the request is granted by the PTA module according to the information bits.

9. An apparatus capable of wireless communications, comprising:

a second wireless transceiving module; and a PTA module, coupled between a first wireless transceiving module and the second wireless transceiving module, wherein the PTA module receives a request for a first signal transceiving to be performed in a 625 μs time slot from the first wireless transceiving module, the request comprises length information about length of the transceiving time period for the first signal transceiving, and, after the request is granted by the PTA module, the PTA module or the second wireless transceiving module subtracts the transceiving time period from the 625 μs time slot to obtain a residual time period, the second wireless transceiving module performs a second signal transceiving during said residual time period of the 625 μs time slot in response to the length information.

10. The apparatus as claimed in claim 9, wherein the PTA module estimates the residual time period in the 625 μs time slot according to the length information and informs the second wireless transceiving module of the residual time period, and the second wireless transceiving module performs the second signal transceiving during the residual time period of the 625 μs time slot.

11. The apparatus as claimed in claim 9, wherein the PTA module informs the second wireless transceiving module of the length information, and the second wireless transceiving module estimates the residual time period in the 625 μs time slot according to the length information and performs the second signal transceiving during the residual time period of the 625 μs time slot.

12. The apparatus as claimed in claim 9, wherein the first wireless transceiving module is a Bluetooth module and the second wireless transceiving module is a Wireless Local Area Network (WLAN) module.

13. The apparatus as claimed in claim 9, wherein the first wireless transceiving module is a Bluetooth module and the second wireless transceiving module is a WiMAX module.

14. The apparatus as claimed in claim 9, wherein the length information comprises two bits to indicate four categories of data packets, wherein the four categories of the data packets have different lengths of transceiving time periods.

15. The apparatus as claimed in claim 9, wherein the first wireless transceiving module is connected to the PTA module via a single-wire transmission line, the PTA module receives the request from the first wireless transceiving module via the single-wire transmission line, and transmits information about that the request is granted to the first wireless transceiving module via the single-wire transmission line.

16. The apparatus as claimed in claim 15, wherein the request comprises a series of information bits sequentially transmitted to the PTA module through the single-wire transmission line.

17. The apparatus as claimed in claim 16, wherein the information bits comprises a priority bit indicating whether the priority of the request is high, and an TX/RX bit indicating whether the first signal transceiving requested by the request is to transmit a first signal or to receive a first signal.

18. The apparatus as claimed in claim 17, wherein the PTA module determines whether the request is granted according to the information bits.

19. An apparatus capable of wireless communications, comprising:

a first wireless transceiving module; and a PTA module, coupled between the first wireless transceiving module and a second wireless transceiving module, wherein the PTA module receives a request for a first signal transceiving to be performed in a 625 tJs time slot from the first wireless transceiving module, the request comprises length information about length of the transceiving time period for the first signal transceiving, and, after granting the request, transmitting the length information to the second wireless transceiving module, the PTA module or the second wireless transceiving module subtracts the transceiving time period from the 625 μs time slot to obtain a residual time period; thereby enabling the second wireless transceiving module to perform a second signal transceiving during said residual time period of the 625 tJs time slot in response to the length information.

* * * * *